(12) United States Patent
Fuchs et al.

(10) Patent No.: US 8,851,668 B2
(45) Date of Patent: Oct. 7, 2014

(54) GLASSES

(75) Inventors: Gerhard Fuchs, Kauns (AT); Rupert Spindelbalker, Puchenau (AT)

(73) Assignee: Silhouette International Schmied AG, Linz (AT)

( * ) Notice: Subject to any disclaimer, the term of this patent is extended or adjusted under 35 U.S.C. 154(b) by 39 days.

(21) Appl. No.: 13/574,659

(22) PCT Filed: Jan. 21, 2011

(86) PCT No.: PCT/AT2011/000036
§ 371 (c)(1),
(2), (4) Date: Jul. 23, 2012

(87) PCT Pub. No.: WO2011/091456
PCT Pub. Date: Aug. 4, 2011

(65) Prior Publication Data
US 2012/0293767 A1    Nov. 22, 2012

(30) Foreign Application Priority Data

Jan. 28, 2010   (AT) .................................. A 112/2010

(51) Int. Cl.
*G02C 5/12*   (2006.01)
(52) U.S. Cl.
CPC .............. *G02C 5/124* (2013.01); *G02C 5/122* (2013.01); *G02C 5/126* (2013.01)
USPC .......................................... 351/137; 351/138
(58) Field of Classification Search
CPC .......... G02C 5/12; G02C 5/122; G02C 5/124; G02C 5/126
USPC ................................................ 351/136–139
See application file for complete search history.

(56) References Cited

U.S. PATENT DOCUMENTS

| 4,896,957 A | * | 1/1990 | Speer ............................ 351/137 |
| 5,696,572 A | | 12/1997 | Winkler |
| 7,648,235 B1 | * | 1/2010 | Rosenfeld et al. ............ 351/131 |
| 2001/0009451 A1 | * | 7/2001 | Kroman ........................ 351/136 |

FOREIGN PATENT DOCUMENTS

| CN | 2010 17112 | 2/2008 |
| DE | 510 758 | 10/1930 |
| DE | 29 30 094 | 2/1981 |
| DE | 36 38 311 | 9/1987 |
| DE | 44 02 983 | 8/1995 |
| EP | 0 237 881 | 9/1987 |
| FR | 2 476 332 | 8/1981 |
| JP | 61-089815 | 6/1986 |
| JP | H04-75314 | 7/1995 |
| JP | 2009-145552 | 7/2009 |

OTHER PUBLICATIONS

International Search Report of PCT/AT2011/000036, date of mailing Apr. 28, 2011.

* cited by examiner

*Primary Examiner* — Darryl J Collins
(74) *Attorney, Agent, or Firm* — Collard & Roe, P.C.

(57) ABSTRACT

Glasses are described having a frame (3) and having nose pads (6) provided in the region of frame attachments (7), which have catch positions arranged in succession in an adjustment direction. To allow an advantageous glasses adaptation, it is proposed that the nose pads (6) be provided on the side opposite to their support surface (10) with a plug-in attachment (9) protruding transversely to the support surface (10), which forms at least two catches (11) in succession in the plug-in direction for alternately engaging in a catch recess (8) of the frame attachments (7).

4 Claims, 2 Drawing Sheets

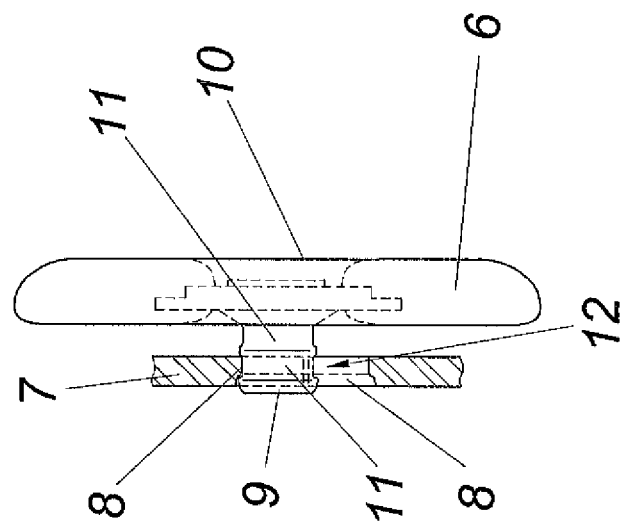
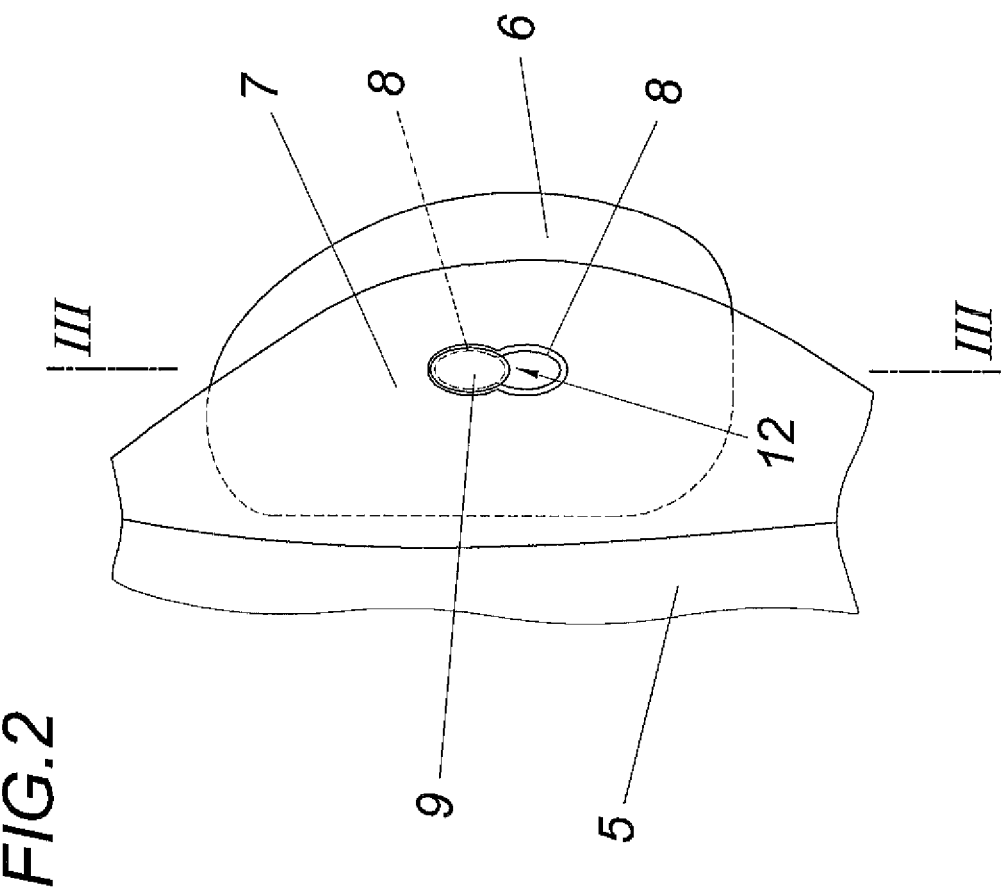

GLASSES

CROSS REFERENCE TO RELATED APPLICATIONS

This application is the National Stage of PCT/AT2011/000036 filed on Jan. 21, 2011, which claims priority under 35 U.S.C. §119 of Austrian Application No. A 112/2010 filed on Jan. 28, 2010, the disclosure of which is incorporated by reference. The international application under PCT article 21(2) was not published in English.

FIELD OF THE INVENTION

The invention relates to glasses having a frame and having nose pads, which have catch positions arranged in succession in an adjustment direction, provided in the region of frame attachments.

DESCRIPTION OF THE PRIOR ART

To be able to adapt glasses to the nose shape of a glasses wearer, arranging the nose pads so they are adjustable on the frame accommodating the glasses lenses is known, for example, in that the nose pads are mounted so they are pivotably adjustable between multiple catch positions in a receptacle groove extending along the rim circumference. Another known adjustment device provides nose pads having a fastening attachment opposite to the support surface (DE 36 38 311 C2), in which a pocket hole substantially parallel to the support surface having expanded catch recesses arranged in succession is implemented for a catch head, which is formed onto the end of a frame attachment implemented in the form of a fastening arm. Depending on the catch position, the nose pad can therefore be adjusted along the frame attachment, limited pivoting to all sides of the nose pad being ensured by the spherical catch head for the most pressure-free possible contact on the nose. This known adjustment of the nose pad, which has a comparatively simple design, however, has the disadvantage that adaptation to the noses of different widths is only possible to a limited extent through a displacement of the nose pads in the longitudinal direction of the nose.

SUMMARY OF THE INVENTION

The invention is therefore based on the object of implementing glasses of the type described at the beginning so that an advantageous adaptation of the nose pads to the nose width in particular can be ensured.

The invention achieves the stated object in that the nose pads are provided on the side opposite to their support surface with a plug-in attachment protruding transversely to the support surface, which forms at least two catches in succession in the plug-in direction for alternately engaging in a catch recess of the frame attachments.

As a result of this measure, the nose pad is adjusted transversely to its support surface in the plug-in direction of its plug-in attachment, i.e., transversely to the nose, which allows the desired adaptation to different nose widths, and using very simple structural means, because the catch recess is provided in a frame attachment. The plug-in attachment of the nose pads is provided with the catches in succession in the plug-in direction, which determine the spacing of the nose pads from the frame attachments. The limited pivoting capability to all sides of the nose pads because of the catches held in the catch recesses of the frame attachments is made possible in a simple manner if the catches of the plug-in attachments are formed as catch thickened areas, which result in a type of ball-and-socket joint with the respective catch recess. However, it is entirely possible to provide the catches of the plug-in attachments in the form of catch tapers, which engage in the catch recesses. Although the proposed design is suitable in particular for glasses frames having a rim for the glasses lenses, because in this case the frame attachments accommodating the nose pads can be provided in a peripheral section of the rim, the invention is in no way restricted to glasses having a rim formed by the frame. Rimless glasses could certainly also be used, in which the frame attachments adjoin a nose bridge, via which the rimless lenses are connected to one another.

In addition to the adjustment of the nose pads transversely to their support surface, an adjustment can be provided in the longitudinal direction of the frame attachments, if the frame has at least two catch recesses for the plug-in attachment in succession in the longitudinal direction of the frame attachments for each nose pad. In this case, through the selection of one of the catch recesses provided with spacing in the longitudinal direction of the frame attachments for the fastening of the nose pad, the desired adaptation of the glasses with respect to height, i.e., along the nose, can be performed. Particularly simple design conditions result in this context in that the catch recesses in succession in the longitudinal direction of the frame attachments are connected using a passage for the plug-in attachment. Specifically, as a result of such a design, the plug-in attachment of the nose pads does not need to be pulled out in the plug-in direction from the respective catch recess in order to be inserted back into the adjacent catch recess, because the nose pads, upon provision of catch tapers, can be displaced through the passage in the respective selected catch position of the plug-in attachment from one catch recess into the adjacent one.

Since in general the nose pads have a longitudinal extension in the longitudinal direction of the nose, a rotation of the nose pads in the catch recesses of the frame attachments is to be avoided. For this purpose, the plug-in attachments of the nose pads can have a cross section deviating from a circular cross section, preferably an oval cross section, to which the opening cross section of the catch recesses is to be adapted, so that the plug-in attachments of the nose pads are secured in the catch recesses against rotation around the axis.

BRIEF DESCRIPTION OF THE DRAWING

The object of the invention is shown as an example in the drawing. In the figures:

FIG. 2 shows a glasses frame in the region of the nose pad in a schematic view on the frame side facing away from the nose pad in an enlarged scale, FIG. 3 shows a schematic section along line III-III of FIG. 2.

DESCRIPTION OF THE PREFERRED EMBODIMENT

Figure 1:
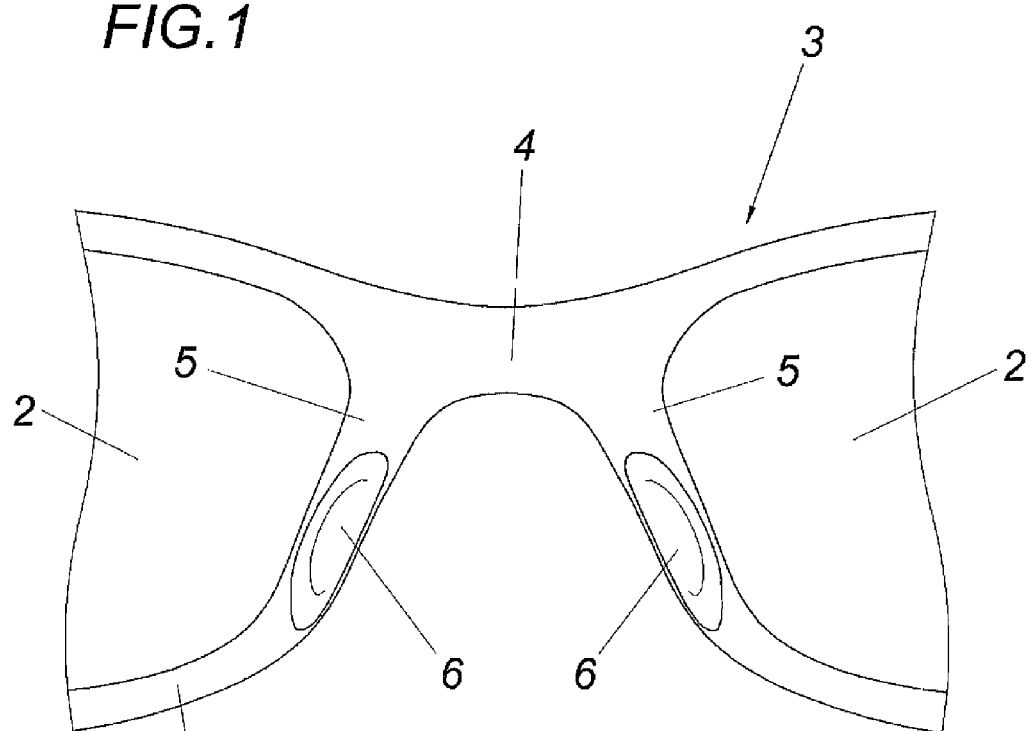
FIG. 1 shows glasses according to the invention in detail in the region of the nose bridge in a rear view.

The glasses shown in FIG. 1 are provided with a frame 3 forming a rim 1 for glasses lenses 2, the frame forming a nose bridge 4 and carrying nose pads 6 in the peripheral section 5 of the rim 1 adjoining the nose bridge 4, the nose pads being mounted so they are adjustable transversely to the peripheral section 5, on the one hand, and in its peripheral direction, on the other hand. For this purpose, the peripheral section 5 of the frame 1 according to FIGS. 2 and 3 has a frame attachment 7 for the nose pad 6 having two catch recesses 8, which are arranged in the longitudinal direction of the frame attachment 7 and accordingly in succession in the peripheral direction of the peripheral section 5, for a plug-in attachment 9 of the nose pad 6. This plug-in attachment 9 protrudes transversely to the nose pad 6 on the side facing away from the support surface 10 of the nose pad 6, as can be inferred from FIG. 3 in particular. Two catches 11 are provided along the plug-in attachment 9 in the form of tapers of the plug-in attachment 9, which alternately interact with one of the catch recesses 8 of the frame attachment 7. The catch position is shown in FIG. 3 in which the nose pad 6 protrudes toward the nose, which allows an adaptation of the glasses to narrow noses. For broader noses, the plug-in attachment 9 is pressed deeper into the catch recess 8, so that the catch 11 closer to the nose pad 6 comes into use.

The two catch recesses 8 arranged in succession in the longitudinal direction of the frame attachment 7 allow the additional offset of the nose pads 6 in the peripheral direction of the frame 1, which allows an additional glasses adaptation to the facial anatomy of a glasses wearer. Since the two catch recesses 8 are connected using a passage 12 for the plug-in attachment 9, the nose pad 6 can be displaced between the two catch recesses 8 in the selected catch position for the catches 11, so that detaching the nose pad 6 from the frame attachment 7 and inserting it again into the respective other catch recess 8 can be omitted.

As can be inferred from FIG. 2, the plug-in attachment 9 has an oval cross section deviating from the circular shape, which substantially corresponds to the opening cross section of the catch recesses 8, so that the nose pad 6 is held twist-locked in the catch recesses 8 of the frame attachment 7. In order to avoid unintentional detachment of the nose pads 6 from the catch recesses 8, the free end of the plug-in attachment 9 is formed thickened. The plug-in attachment 9 can therefore only be detached from the catch recesses 8 with a greater application of force.

Figure 4:
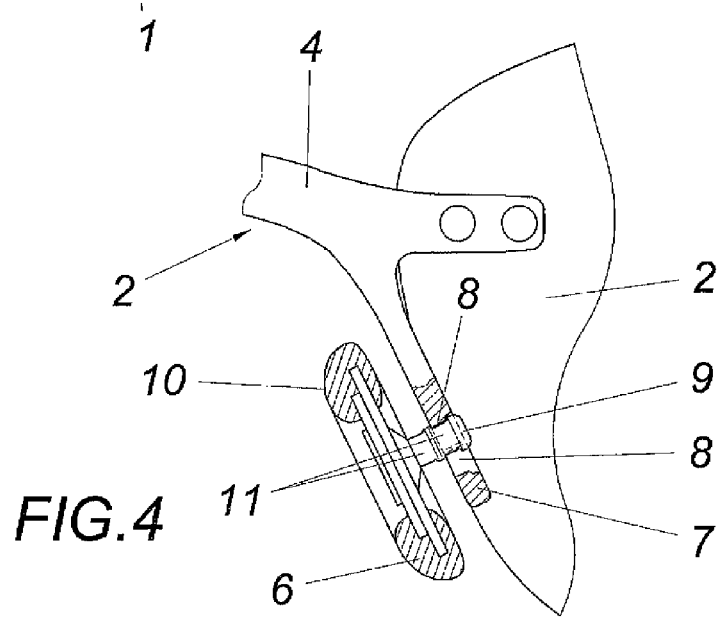
FIG. 4 shows a design variant of glasses according to the invention in detail in the region of a nose pad in a rear view in partial section.

FIG. 4 shows that the described adjustment of the nose pads 6 can also be used in rimless glasses, in which the glasses lenses 2 are only connected to one another by a nose bridge 4 of the frame 2. In this case, the frame attachment 7 accommodating the nose pads 6 adjoins the nose bridge 4 in the peripheral direction of the respective glasses lens 2. The fastening of the nose pads 6 via a plug-in attachment 9, which engages in catch recesses 8 of the frame attachment 7 and is provided with catches 11, on the side facing away from the support surface 10 of the nose pad 6, results in a corresponding manner with the embodiment according to FIGS. 2 and 3.

The invention claimed is:

1. Glasses having a frame (3) and having nose pads (6) provided in the region of frame attachments (7), which have catch recesses arranged in succession in an adjustment direction, wherein the nose pads (6) are provided on the side opposite to their support surface (10) with a plug-in attachment (9) protruding transversely to the support surface (10), which forms at least two catches (11) in succession in the plug-in direction for alternately engaging in a catch recess (8) of the frame attachments (7).

2. The glasses according to claim 1, wherein the frame (3) has at least two catch recesses (8) in succession in the longitudinal direction of the frame attachments (7) for the plug-in attachment (9) of the nose pads (6) for each nose pad (6).

3. The glasses according to claim 2, wherein the catch recesses (8) in succession in the longitudinal direction of the frame attachments (7) are connected using a passage (12) for the plug-in attachment (9) of the nose pads (6).

4. The glasses according to claim 1, wherein the plug-in attachments (9) of the nose pads (6) have a cross section deviating from the circular cross section, preferably an oval cross section, and the opening cross section of the catch recesses (8) of the frame attachments (7) is adapted to the cross section of the plug-in attachments (9).

* * * * *